United States Patent [19]

Ishihara et al.

[11] Patent Number: 5,739,751
[45] Date of Patent: Apr. 14, 1998

[54] HAZARD WARNING LAMP DEVICE

[75] Inventors: Dai Ishihara; Katsufumi Nagatome; Yoshimitsu Ishida; Kazunari Ishiguro, all of Wako; Norio Takahashi; Mitsuo Horie, both of Turugashima, all of Japan

[73] Assignee: Toyo Denso Kabushiki Kaisha, Tokyo, Japan

[21] Appl. No.: 618,761

[22] Filed: Mar. 20, 1996

[30] Foreign Application Priority Data

Mar. 20, 1995 [JP] Japan ..................... 7-060689

[51] Int. Cl.⁶ ......................................... H01H 3/16
[52] U.S. Cl. ................. 340/475; 340/471; 200/61.27; 200/61.34; 200/61.54
[58] Field of Search ........................ 340/475, 463, 340/464, 471, 468; 200/61.27, 61.3, 61.33, 61.34, 61.35, 61.36, 61.37, 61.38, 61.54

[56] References Cited

U.S. PATENT DOCUMENTS

| Re. 28,479 | 7/1975 | Suzuki et al. | 340/471 |
|---|---|---|---|
| 3,914,566 | 10/1975 | Wendling | 200/61.27 |
| 3,934,101 | 1/1976 | Jones | 200/61.27 |
| 4,173,013 | 10/1979 | Spiteri | 340/73 |
| 4,315,117 | 2/1982 | Kokubu | 200/61.27 |
| 4,379,954 | 4/1983 | Iwata et al. | 200/61.27 |
| 4,739,130 | 4/1988 | Roller et al. | 200/61.27 |
| 4,791,253 | 12/1988 | Erdelitsch et al. | 200/61.27 |
| 5,049,706 | 9/1991 | Du Rocher | 200/61.54 |

FOREIGN PATENT DOCUMENTS

| 709789 | 6/1954 | United Kingdom . |
|---|---|---|
| 733842 | 7/1955 | United Kingdom . |
| 863927 | 5/1961 | United Kingdom . |

OTHER PUBLICATIONS

Automobile, Manual, published by Watai Automobile Company (1995), Title page and pp. 41 and 42.

*Primary Examiner*—Jeffery Hofsass
*Assistant Examiner*—Davetta Woods
*Attorney, Agent, or Firm*—Lyon & Lyon LLP

[57] ABSTRACT

A control mechanism for controlling hazard warning and turn indicator lamps in a vehicle is combined with a control lever in the vicinity of a steering wheel for easy operation. When the control lever is angularly displaced in a first direction, an elevator (displacing member) is displaced in a corresponding direction. At this time, a movable contact is also displaced into contact with hazard warning fixed contacts, turning on a hazard switch to energize turn signal lamps in a hazard warning state. When the control lever is displaced in a direction substantially perpendicular to the first direction while in the hazard warning state, a turn switch is turned on, thereby electrically canceling the hazard warning state. The hazard warning state is thus automatically canceled upon switching from the hazard warning state to a direction indicating state.

11 Claims, 15 Drawing Sheets

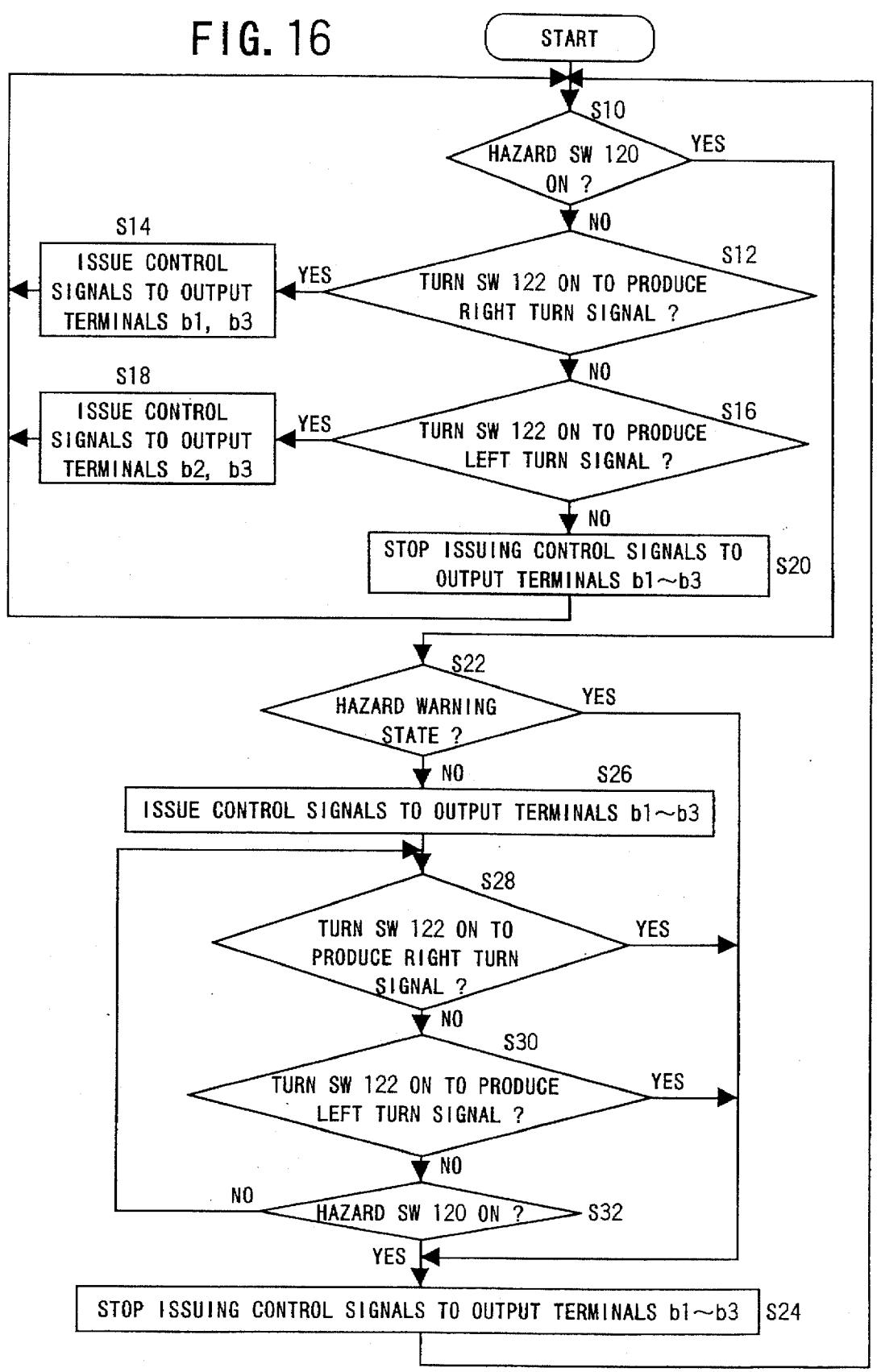

HAZARD WARNING LAMP DEVICE

BACKGROUND OF THE INVENTION

1. Field of the Invention

The present invention relates to a hazard warning lamp device including a hazard switch mechanism combined with a control lever for turning on and off turn signal lamps, the hazard switch mechanism being operable to automatically cancel a hazard warning state when the control lever is operated to turn on the turn signal lamps.

2. Description of the Related Art

Motor vehicles are equipped with various lamps for the purpose of maintaining safety while they are running and at rest. Those lamps include side lamps for indicating the width of the motor vehicle to other motor vehicles, head lamps for giving illumination ahead of the motor vehicle at night, and turn signal lamps for indicating the direction in which the driver intends to turn. These lamps are turned on and off by control levers or the like that are positioned near the steering wheel.

The turn signal lamps also function as hazard warning lamps which indicate, to other motor vehicles, the motor vehicle has stopped in case of emergency such as a breakdown or accident. When the driver operates a hazard switch positioned on an instrument panel or a column, different from a control lever of the turn signal lamps, both the hazard warning lamps, i.e., both the turn signal lamps, flash at the same time to indicate that the motor vehicle is at rest to other motor vehicles running nearby.

One problem with the conventional arrangement of the hazard switch is that since the hazard switch is spaced from the steering wheel, the driver cannot operate the hazard switch quickly and smoothly enough to turn on the hazard warning lamps when the driver stops the motor vehicle in case of emergency.

Furthermore, because the hazard switch and control levers for turning on and off other lamps function independently of each other, if the driver starts the motor vehicle again from an emergency stop, the driver has to turn off the hazard switch to cancel a hazard warning state and thereafter operate the control lever to flash the turn signal lamps. This process of successive switch operation has been cumbersome to carry out.

SUMMARY OF THE INVENTION

It is a general object of the present invention to provide a hazard warning lamp device having a control mechanism which can be operated with ease and can be operated to shift automatically from the turn-on state of hazard warning lamps to the turn-on state of other lamps.

A major object of the present invention is to provide a hazard warning lamp device which will cause turn signal lamps to flash as hazard warning lamps in a hazard warning state when a control lever for the turn signal lamps is operated in a direction substantially perpendicular to the direction in which the control lever is operated to turn on the turn signal lamps to indicate a direction in which the driver intends to make a turn.

Another object of the present invention is to provide a hazard warning lamp device which, after turn signal lamps have been flashed to indicate a hazard warning state, will cancel the hazard warning state in response to a turn signal supplied to the turn signal lamps, and flash the turn signal lamps to indicate a turning direction indicating state.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 16 is a flowchart of an operation sequence of the processing circuit shown in FIG. 15.

DETAILED DESCRIPTION OF THE PREFERRED EMBODIMENTS

Figure 1:
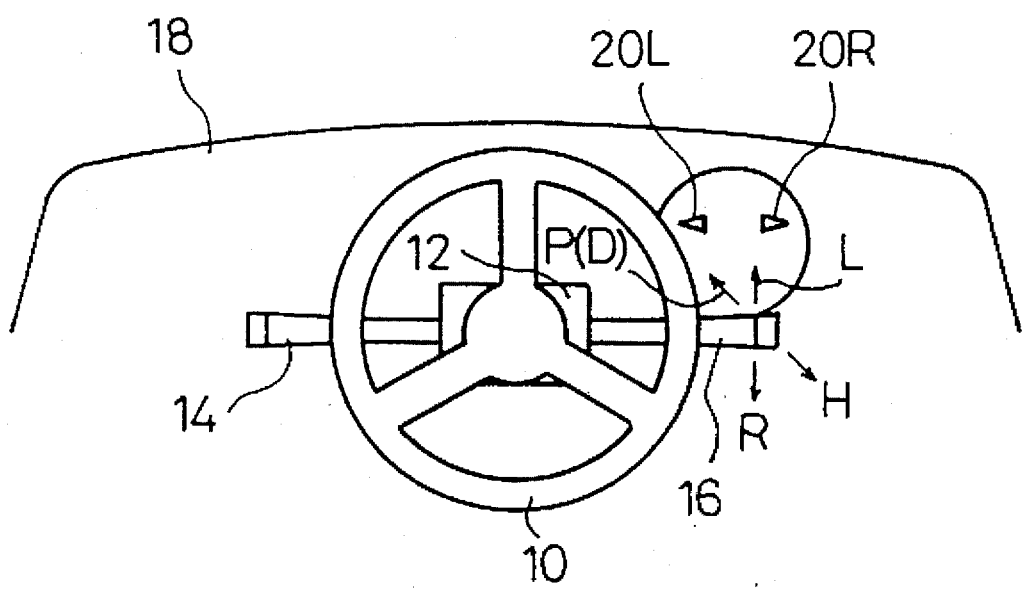
FIG. 1 is a schematic elevational view of the cockpit of a motor vehicle which incorporates a hazard warning lamp device according to the present invention.

FIG. 1 shows the cockpit of a motor vehicle which incorporates a hazard warning lamp device according to the present invention. As shown in FIG. 1, the hazard warning lamp device includes a control unit 12 for operating a windshield wiper and lamps, the control unit 12 being mounted on the shaft of a steering wheel 10. The windshield wiper can be operated by a control lever 14 on the control unit 12, and the lamps can be turned on and off by another control lever 16 on the control unit 12. The motor vehicle has an instrument panel 18 which supports thereon various indicators including lamps 20L, 20R for indicating turn-on and -off conditions of turn signal lamps.

When the control lever 16 is shifted upwardly in the direction indicated by the arrow L, the left turn signal lamps are flashed, and when the control lever 16 is shifted downwardly in the direction indicated by the arrow R, the right turn signal lamps are flashed. When the control lever 16 is pulled in the direction indicated by the arrow P, head lamps temporarily emit upper beam illumination in a passing state, indicating that the driver intends to pass another motor vehicle. When the control lever 16 is further pulled in the direction indicated by the arrow D (further than arrow P) the head lamps switch alternately between upper and lower beam illumination. When the control lever 16 is shifted toward the instrument panel 18 in the direction indicated by the arrow H, the turn signal lamps are simultaneously flashed in a hazard warning state indicating an emergency stop to other motor vehicles.

Figure 2:
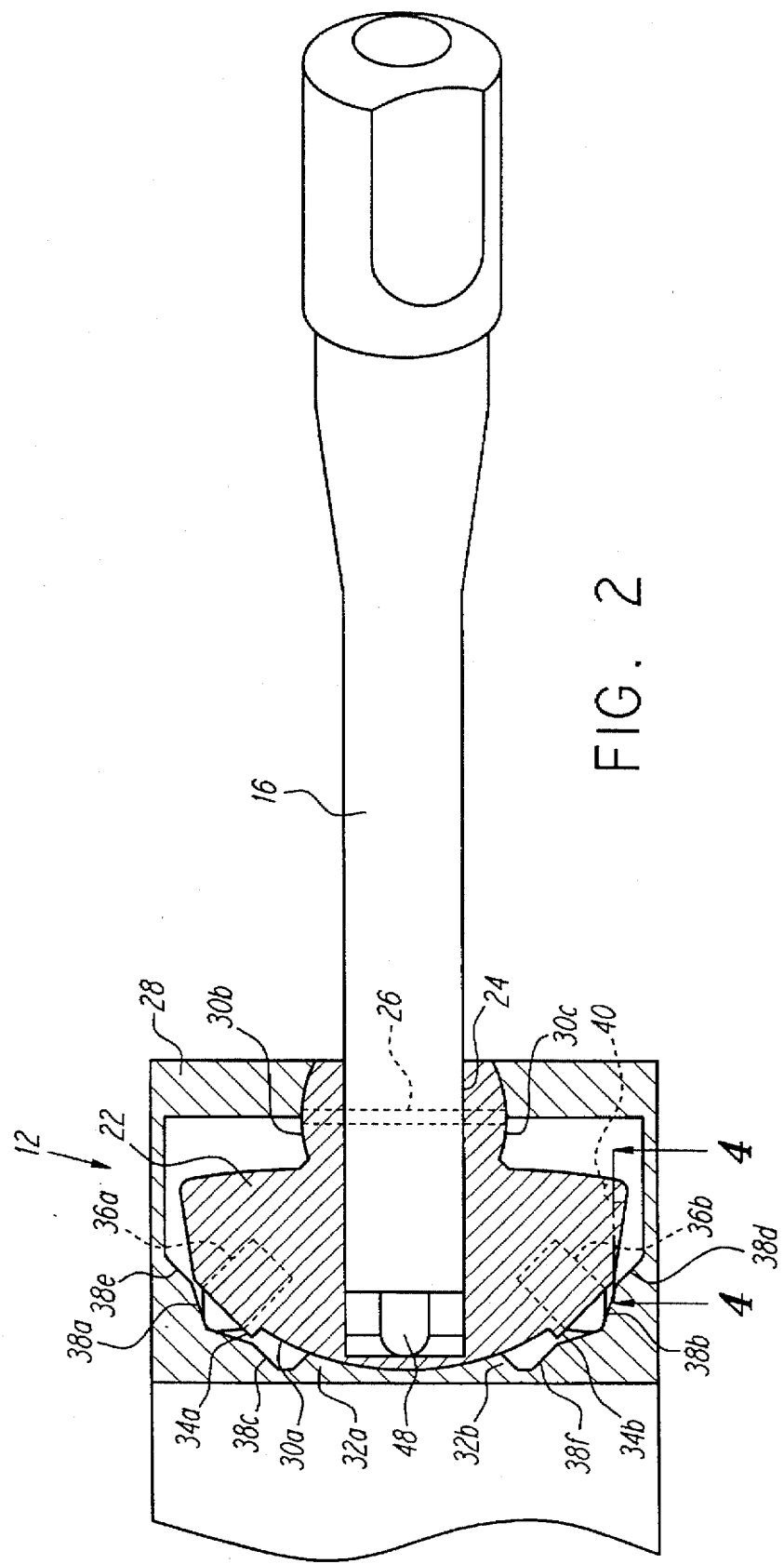
FIG. 2 is a cross-sectional view of a right/left turn switching structure, held in a neutral position, in a control unit of the hazard warning lamp device shown in FIG. 1.
Figure 3:
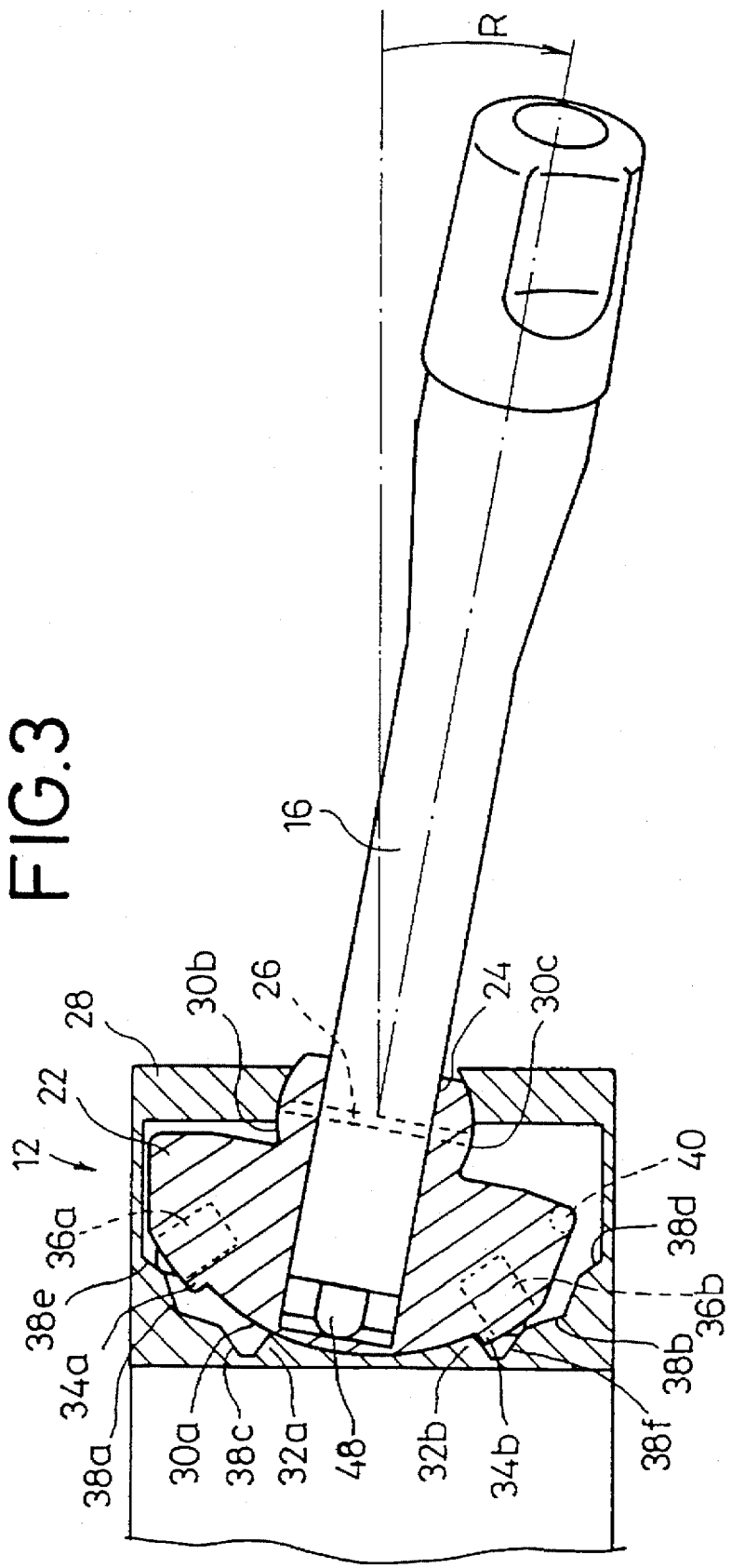
FIG. 3 is a cross-sectional view of the right/left turn switching structure, shifted to a right-turn position, in the control unit.
Figure 4:
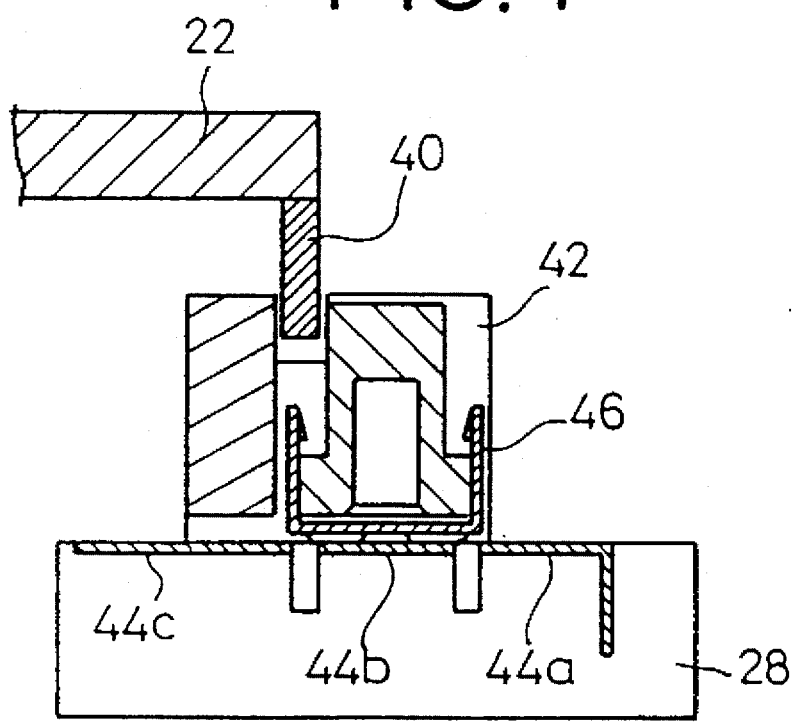
FIG. 4 is a cross-sectional view, taken substantially on the line IV—IV in FIG. 2, of a contact switching structure that can be actuated by a lever holder shown in FIG. 2.
Figure 5:
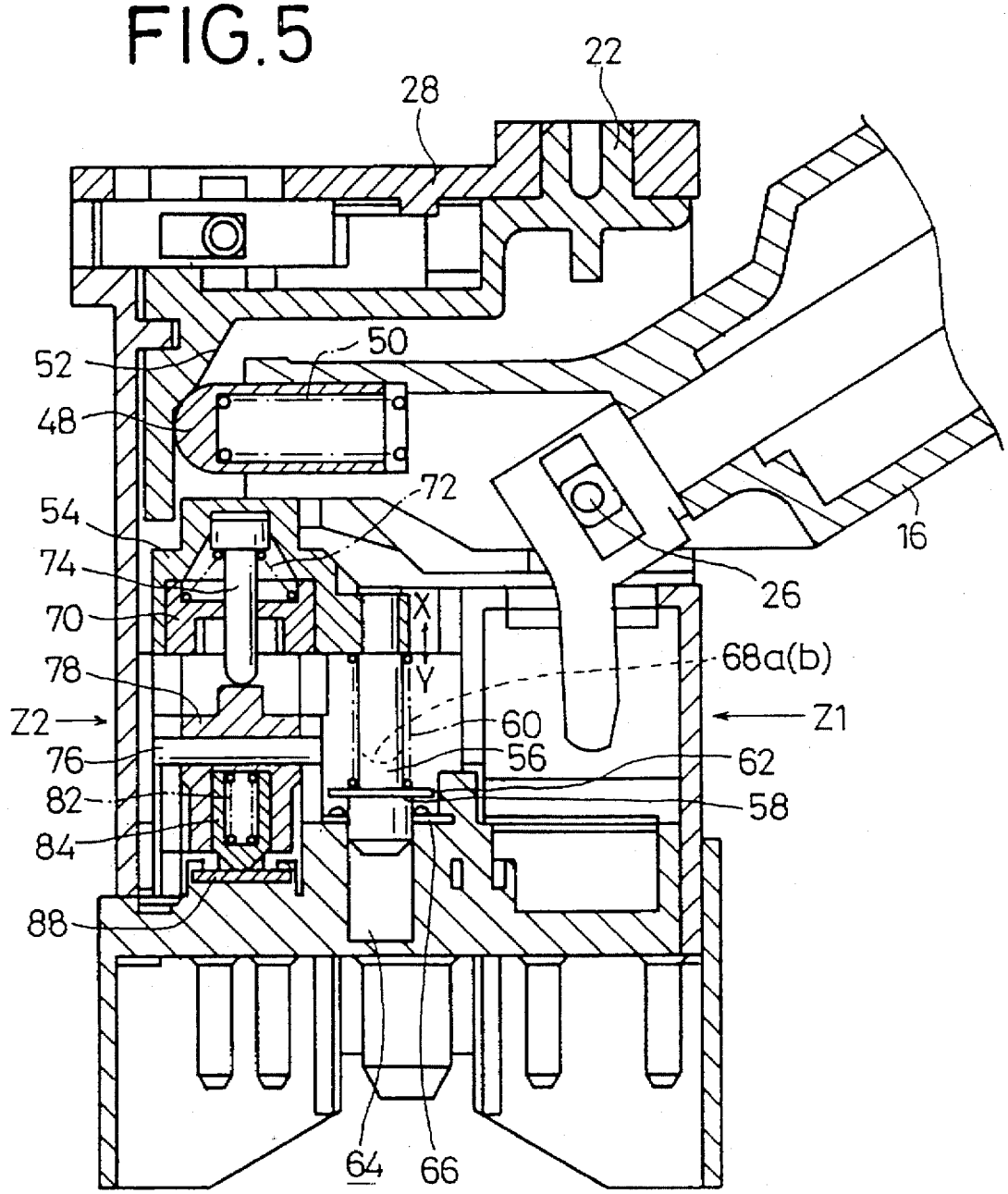
FIG. 5 is a cross-sectional view of a hazard, passing, and upper/lower beam switching structure, held in a neutral position, in the control unit.

The control unit 12 for operating the lamps now will be described. The control unit 12 has a mechanism for turning on and off the left and right turn signal lamps as shown in FIGS. 2 through 4. In FIGS. 2 through 4, the control lever 16 has an end portion inserted through a hole 24 defined centrally in a lever holder 22 and retained in the lever holder 22 by a pin 26. The lever holder 22 is housed in a casing 28 of the control unit 12. The lever holder 22 has an arcuate surface 30a positioned at and extending across the end of the control lever 16 and a pair of arcuate surfaces 30b, 30c extending concentrically with the arcuate surface 30a and positioned remotely therefrom, the arcuate surfaces 30b, 30c having respective radii of curvature which are smaller than the radius of curvature of the arcuate surface 30a. The pin 26 extends through the arcuate surfaces 30b, 30c and the control lever 16. The arcuate surfaces 30a, 30b, 30c are slidably held against corresponding surfaces of the casing 28, so that the lever holder 22 is angularly movable in the casing 28. The lever holder 22 has a pair of spaced steps 34a, 34b disposed on the respective ends of the arcuate surface 30a for limiting the angular movement of the lever holder 22 in the casing 28 by abutting engagement with respective steps 32a, 32b of the casing 28.

Turn click pins 36a, 36b are received in respective cavities that are defined in the lever holder 22 near the respective steps 34a, 34b. The turn click pins 36a, 36b are normally urged by respective springs (not shown) to cause their pointed outer ends to project from the lever holder 22. The casing 28 has a first pair of recesses 38a, 38b defined in its inner wall surface for receiving the turn click pins 36a, 36b, respectively, to hold the control lever 16 in a neutral position, a second pair of recesses 38c, 38d defined in the inner wall surface for receiving the turn click pins 36a, 36b, respectively, to hold the control lever 16 in the position shifted in the direction indicated by the arrow L (see FIG. 1), and a third pair of recesses 38e, 38f defined in the inner wall surface for receiving the turn click pins 36a, 36b, respectively, to hold the control lever 16 in the position shifted in the direction indicated by the arrow R (see FIGS. 1 and 3).

A turn drive shaft 40 is mounted on a corner of the lever holder 22 near the turn click pin 36b. As shown in FIG. 4, the turn drive shaft 40 engages a turn contact holder 42 disposed in the casing 28. The turn contact holder 42 holds a turn movable contact 46 which is slidable along turn fixed contacts 44a, 44b, 44c that are fixed to the casing 28. The turn movable contact 46 is held in contact with the turn fixed contacts 44a, 44b, 44c when the control lever 16 is respectively in the neutral position, the position shifted in the direction indicated by the arrow L, and the position shifted in the direction indicated by the arrow R.

A mechanism for establishing the operating states of the left and right turn signal lamps, the head lamps in passing, the head lamps in upper/lower beam, and the turn signal lamps in hazard warning is shown in FIGS. 5 through 10. A hazard click pin 48 is mounted in the end of the control lever 16 that is held by the lever holder 22. The hazard click pin 48 is normally biased in a direction to project from the end of the control lever 16 by a hazard spring 50. The lever holder 22 has a slanted inner surface 52 near the hazard click pin 48. When the control lever 16 is angularly moved about the pin 26 in the direction indicated by the arrow H (see FIGS. 1 and 8) substantially perpendicularly to the directions indicated by the arrows L, R, the hazard click pin 48 engages the slanted inner surface 52, tending to return the control lever 16 to the neutral position under the bias of the hazard spring 50.

An elevator 54 (displacing member) which abuts against the end of the control lever 16 is displaceable in the directions indicated by the arrows X, Y when the control lever 16 is displaced in the directions indicated by the arrows H and P(D). The elevator 54 is held in the casing 28 by springs 55a, 55b (see FIG. 10). The elevator 54 supports a stepped pin 56 mounted thereon, and a movable contact 62 (see also FIG. 9) movable along the stepped pin 56 is mounted on a step 58 of the stepped pin 56 and held by a spring 60. The stepped pin 56 is fitted in a hole 64 defined in the casing 28, and a passing fixed contact 66 mounted on the casing 28 around the hole 64 in confronting relation to the movable contact 62. Hazard fixed contacts 68a, 68b are disposed between the movable contact 62 and the elevator 54. When the control lever 16 is in the neutral position, the movable contact 62 is positioned between the passing fixed contact 66 and the hazard fixed contacts 68a, 68b. When the control lever 16 is displaced in the direction indicated by the arrow H, the movable contact 62 contacts the hazard fixed contacts 68a, 68b (see FIG. 8). When the control lever 16 is displaced in the direction indicated by the arrow P(D), the movable contact 62 contacts the passing fixed contact 66 (see FIGS. 6 and 7). The movable contact 62 and the hazard fixed contacts 66, 68a, 68b jointly make up a switch mechanism.

A shifter pin 74 (see also FIG. 10) is mounted in the elevator 54 by a holder 70 and a spring 72 and has a rockable end that projects from the elevator 54. The rockable end of the shifter pin 74 engages in one of two recesses 80a, 80b (see FIG. 10) that are defined in an end of a dimmer holder 78 angularly movably supported in the casing 28 by a pin 76. A dimmer click pin 84 is mounted in an opposite end of the dimmer holder 78 and normally urged in a direction to project from the dimmer click pin 84 by a spring 82. The dimmer click pin 84 has an end held in abutment against a dimmer movable contact 88 that is supported in the casing 28 through a fixed contact 87. The dimmer movable contact 88 which is swingable about the fixed contact 87 is bent toward the dimmer click pin 84. Dimmer fixed contacts 90a, 90b are mounted on a surface of the casing 28 in confronting relation to the respective opposite ends of the dimmer movable contact 88. When the control lever 16 is displaced in the direction indicated by the arrow D, the dimmer movable contact 88 contacts the dimmer fixed contact 90a. When the control lever 16 is retracted and then displaced again in the direction indicated by the arrow D, the dimmer movable contact 88 contacts the dimmer fixed contact 90b.

Figure 11:
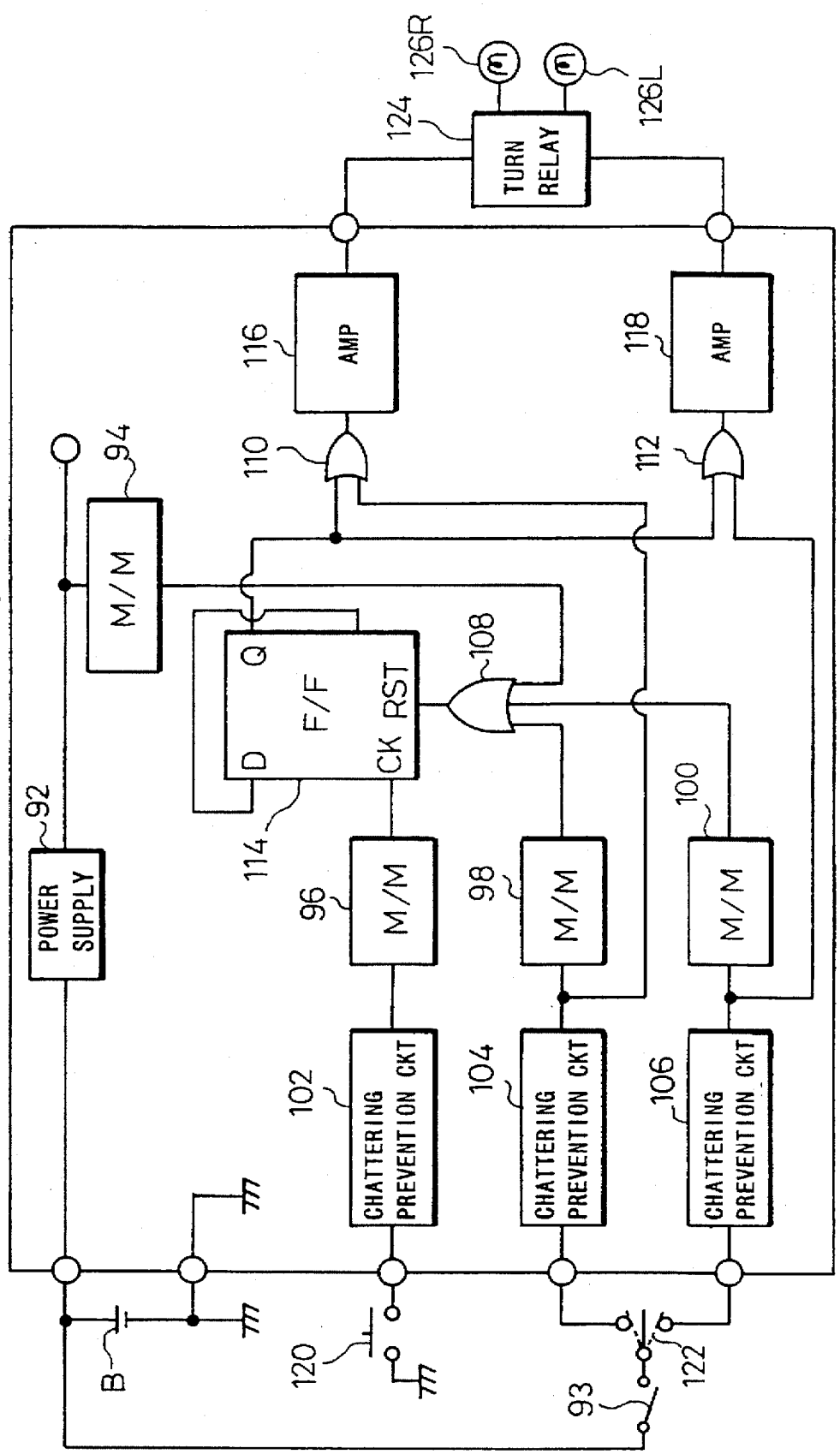
FIG. 11 is a block diagram of a processing circuit for controlling the hazard warning lamp device according to the present invention.

FIG. 11 shows in block form a processing circuit for processing signals from the control unit 12 to control the left and right turn signal lamps. As shown in FIG. 11, the processing circuit comprises a power supply 92, monostable multivibrators 94, 96, 98, 100, chattering prevention circuits 102, 104, 106, OR gates 108, 110, 112, a D flip-flop 114, and amplifiers 116, 118. Processing circuits for controlling the head lamps in passing and upper/lower beam states will be described later.

The power supply 92 is connected to a battery B for generating a start signal when an ignition switch 93 is turned on. The start signal is supplied through the monostable multivibrator 94 and the OR gate 108 to a reset terminal of the D flip-flop 114. The chattering prevention circuit 102 is supplied with a hazard signal from a hazard switch 120. The hazard signal is supplied through the chattering prevention circuit 102 and the monostable multivibrator 96 to a clock terminal of the D flip-flop 114. The chattering prevention circuits 104, 106 are supplied with a right turn signal and a left turn signal, respectively, from a turn switch 122. The right turn signal and the left turn signal are supplied respectively through the chattering prevention circuits 104, 106, the monostable multivibrators 98, 100, and the OR gate 108 to the reset terminal of the D flip-flop 114, and also supplied respectively through the chattering prevention circuits 104, 106 and the OR gates 110, 112 to the amplifiers 116, 118, respectively. The OR gates 110, 112 are supplied with a Q output signal from the D flip-flop 114. The amplifiers 116, 118 amplify output signals, respectively, from the OR gates 110, 112, and supply amplified signals to a turn relay 124. The turn relay 124 turns on and off left and right turn signal lamps 126L, 126R based on the amplified signals from the amplifiers 116, 118.

The OR gates 110, 112, the D flip-flop 114, amplifiers 116, 118, and the turn relay 124 jointly serve as a turn signal lamp energizing means, and the OR gate 108 serves as a hazard warning state canceling means. The hazard switch 120 is composed of the movable contact 62 and the hazard fixed contacts 68a, 68b shown in FIG. 9. The turn switch 122 is composed of the turn fixed contacts 44a, 44b, 44c and the turn movable contact 46 shown in FIG. 4.

Operation and advantages of the control unit 12 and the processing circuit for processing signals from the control unit 12 to turn on and off the left and right turn signal lamps 126L, 126R now will be described.

Figure 12:
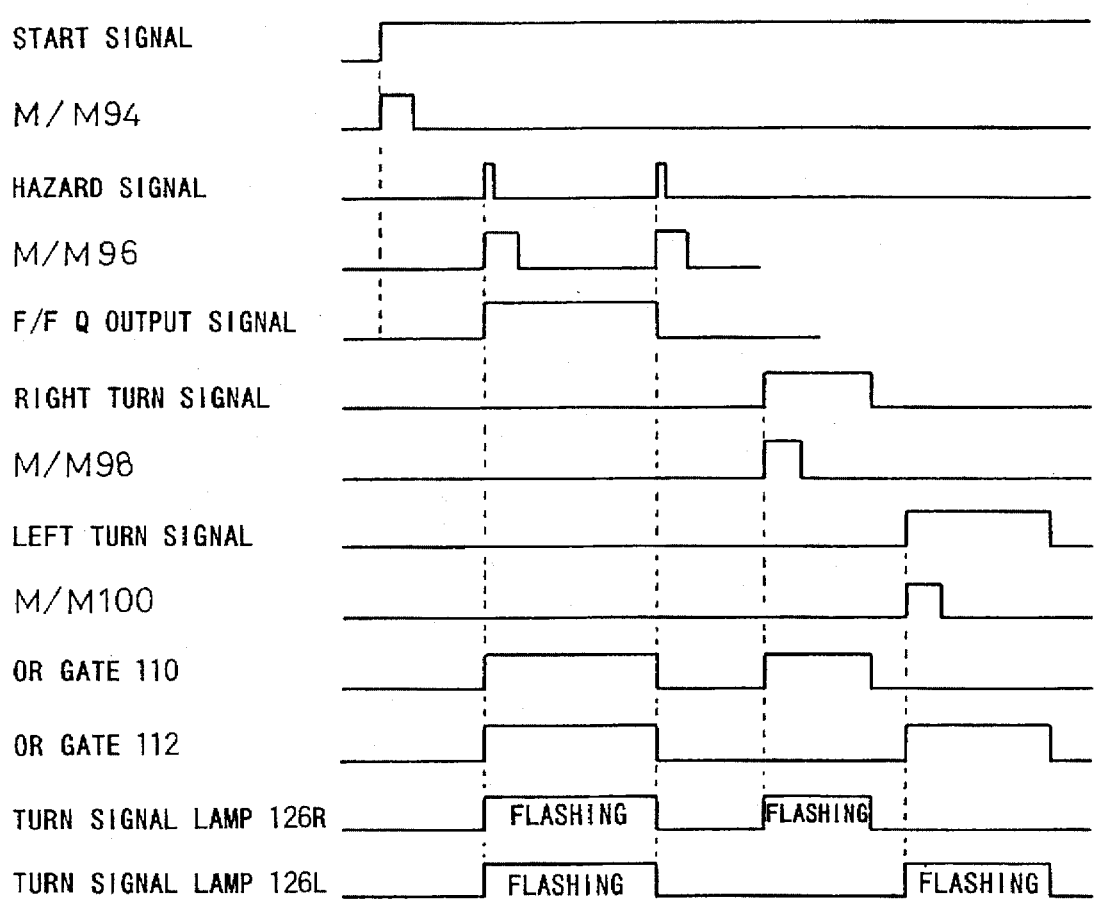
FIG. 12 is a timing chart of an operation sequence for establishing and canceling a hazard warning state and establishing a direction indicating state with the hazard warning lamp device according to the present invention.

A process for establishing and canceling a hazard warning state and establishing a direction indicating state will first be described below with reference to FIG. 12.

When the ignition switch 93 is turned on, a start signal from the power supply 92 is supplied through the monostable multivibrator 94 and the OR gate 108 to the reset terminal of the D flip-flop 114, making a Q output signal thereof low. Since control signals supplied through the OR gates 110, 112 and the amplifiers 116, 118 to the turn relay 124 are turned off, the left and right turn signal lamps 126L, 126R are also turned off.

Now, the hazard switch 120 is turned on. Specifically, the control lever 16 is angularly displaced about the pin 26 in the direction indicated by the arrow H from the neutral position shown in FIG. 5 into the position shown in FIG. 8.

Because the elevator 54 housed in the casing 28 is displaced in the direction indicated by the arrow X under the bias of the springs 55a, 55b as the end of the control lever 16 is displaced, the movable contact 62 supported on the elevator 54 by the stepped pin 56 is displaced into contact with the hazard fixed contacts 68a, 68b. Therefore, the hazard switch 120 is turned on.

A hazard signal generated when the hazard switch 120 is turned on is supplied through the chattering prevention circuit 102 and the monostable multivibrator 96 to the clock terminal of the D flip-flop 114. In response to the hazard signal, the D flip-flop 114 makes its Q output signal high, which is supplied through the OR gates 110, 112 to the amplifiers 116, 118. The amplifiers 116, 118 amplify and supply control signals to the turn relay 124 to flash both the left and right turn signal lamps 126L, 126R.

When the control lever 16 is angularly displaced in the direction indicated by the arrow H, the hazard click pin 48 is resiliently pressed against the slanted surface 52 of the lever holder 22. When the driver releases the control lever 16, the control lever 16 tends to return to the neutral position under the bias of the hazard spring 50.

When the control lever 16 is angularly displaced again in the direction indicated by the arrow H while in a hazard warning state in which the left and right turn signal lamps 126L, 126R are flashed, the hazard switch 120 is turned on, supplying a hazard signal to the clock terminal of the D flip-flop 114. The Q output signal from the D flip-flop 114 now goes low, de-energizing the left and right turn signal lamps 126L, 126R. Therefore, the hazard warning state is canceled.

Accordingly, the driver can selectively establish and cancel the hazard warning state quite easily by displacing the control lever 16 in the direction indicated by the arrow H.

When the control lever 16 is angularly displaced in the direction indicated by the arrow R, only the right turn signal lamps R are flashed, indicating that the motor vehicle is making a right turn to other motor vehicles. Specifically, when the control lever 16 is angularly displaced in the direction indicated by the arrow R (FIG. 3) from the neutral position shown in FIG. 2, the lever holder 22 is turned about an axis normal to the pin 26 until the turn click pins 36a, 36b engage in the respective recesses 38e, 38f in the casing 28, whereupon the control lever 16 remains displaced in the direction indicated by the arrow R. At this time, as shown in FIG. 4, the turn drive shaft 40 mounted on the corner of the lever holder 22 displaces the turn contact holder 42 in the direction indicated by the arrow R, bringing the movable contact 46 into contact with the turn fixed contact 44c. As a result, the turn switch 122 shown in FIG. 11 is turned on in a direction to produce a right turn signal.

The right turn signal generated by the turn switch 122 is supplied through the chattering prevention circuit 104 and the OR gate 110 to the amplifier 116. The amplifier 116 supplies a control signal to the turn relay 124, flashing only the right turn signal lamp 126R.

When the control lever 16 is angularly displaced in the direction indicated by the arrow L, the right turn signal lamp 126R is turned off, the left turn signal lamp 126L is flashed in a similar manner.

Figure 13:
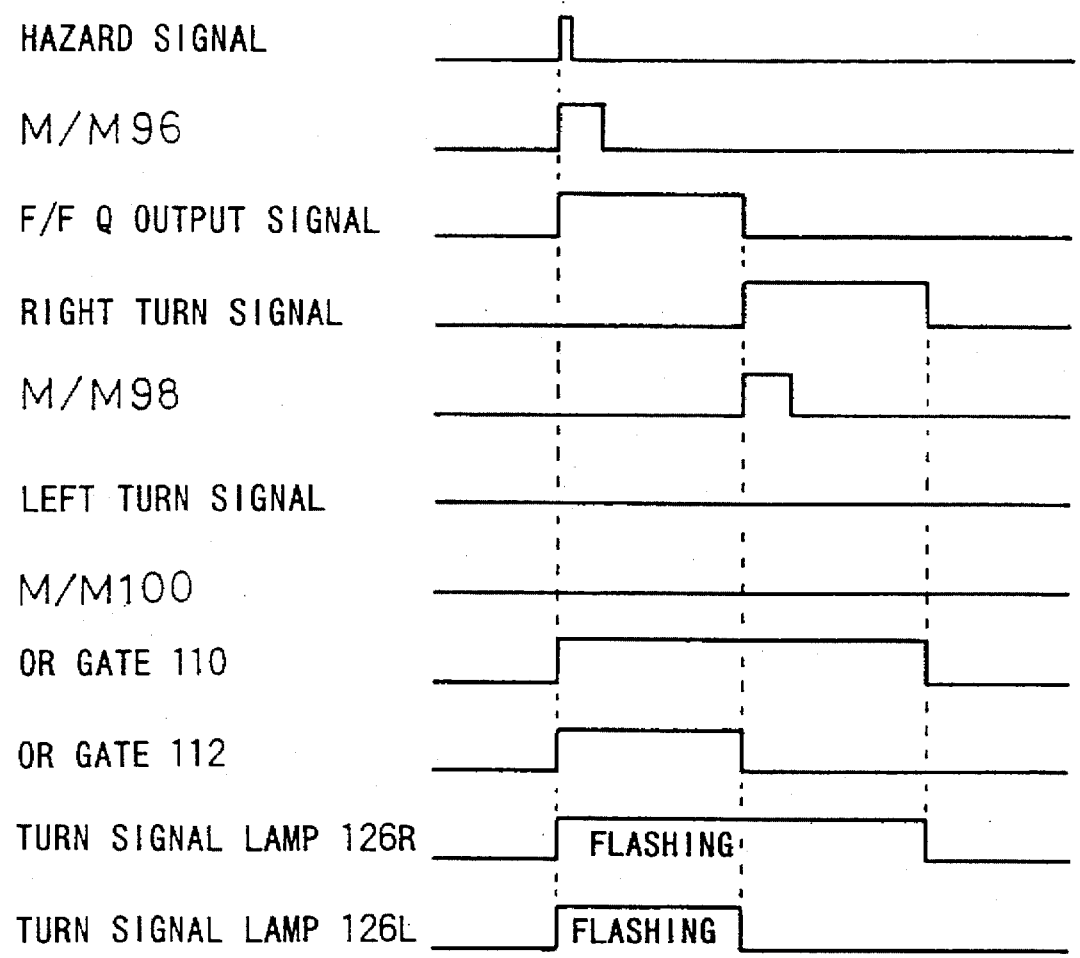
FIG. 13 is a timing chart of an operation sequence for switching turn signal lamps from the hazard warning state to the direction indicating state.

A process for switching the left and right turn signal lamps 126L, 126R from the hazard warning state to a direction indicating state now will be described with reference to FIG. 13.

When the control lever 16 is angularly displaced in the direction indicated by the arrow H, the hazard switch 120 is turned on, flashing both the left and right turn signal lamps 126L, 126R as described above.

When the control lever 16 is now angularly displaced in the direction indicated by the arrow R, the turn switch 122 is turned on in the direction to produce the right turn signal. The right turn signal generated by the turn switch 122 is supplied through the chattering prevention circuit 104, the monostable multivibrator 98, and the OR gate 108 to the reset terminal of the D flip-flop 114, and also through the chattering prevention circuit 104 to the OR gate 110. The Q output signal from the D flip-flop 114 now goes low, and the output signals from the OR gates 110, 112 go high and low, respectively. Consequently, only the amplifier 116 outputs a control signal to the turn relay 124. The hazard warning state is now canceled, and only the right turn signal lamp 126R is flashed.

When the control level 16 is now angularly displaced in the direction indicated by the arrow L, the right turn signal lamp 126R is de-energized, and the left turn signal lamp 126L is flashed.

As described above, the hazard warning state is automatically canceled when the left and right turn signal lamps 126R, 126L are switched from the hazard warning state to the direction indicating state. Therefore, the driver is not required to cancel the hazard warning stat manually, and finds it very easy to operate the control lever 16 for establishing the hazard warning state.

Figure 14:
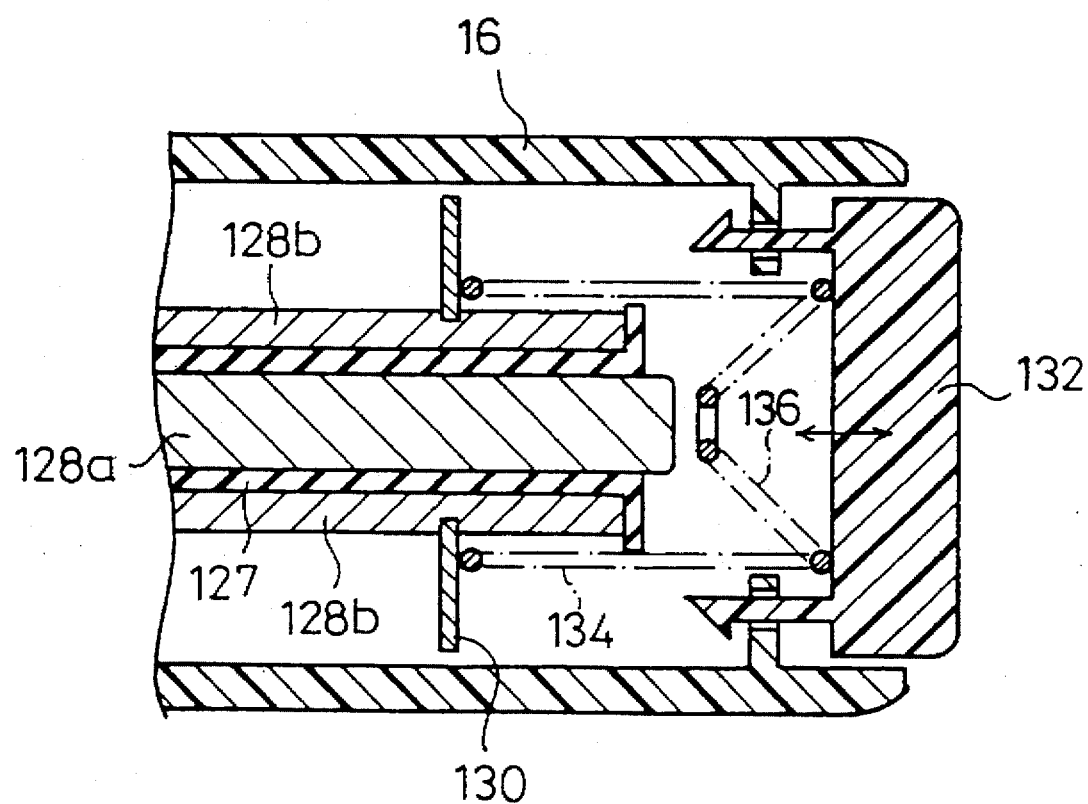
FIG. 14 is a cross-sectional view of a hazard switching structure on the tip end of a control lever.

In the above embodiment, the hazard fixed contacts 68a, 68b of the hazard switch 120 are disposed in the casing 28 of the control unit 12, and the hazard warning state can be established when the control lever 16 is angularly displaced in the direction indicated by the arrow H substantially perpendicularly to the directions indicated by the arrows R, L. However, as shown in FIG. 14, a switch mechanism of the hazard switch 120 may be mounted in the distal end of the control lever 16. In the arrangement shown in FIG. 14, specifically, a tubular insulating member 127 is disposed in the control lever 16, a contract member 128a extends through the tubular insulating member 127 and another contact member 128b is fitted over the tubular insulating member 127. An electrically conductive ring 130 is fitted over the contact member 128b. A hazard knob 132 (displacing member) is disposed in the distal end of the control lever 16, and an electrically conductive coil spring 134 is disposed between the hazard knob 132 and the ring 130. The hazard knob 132 is normally urged to move away from the contact member 128a by the coil spring 134. Another electrically conductive coil spring 136 is held in contact with the coil spring 134 and spaced from the contact member 128a.

When the driver pushes the hazard knob 132 in a direction substantially perpendicularly to the directions in which the driver displaces the control lever 16 in making turns, the coil spring 136 is brought into contact with the contact member 128a. Therefore, the contact members 128a, 128b electrically contact each other through the coil springs 134 and 136. The hazard switch 120 shown in FIG. 11 now produces a hazard signal, flashing both the left and right turn signal lamps 126L, 126R in the hazard warning state.

The control lever 16 may be operated to energize the head lamps in a passing state and also in an upper or lower beam state.

Figure 6:
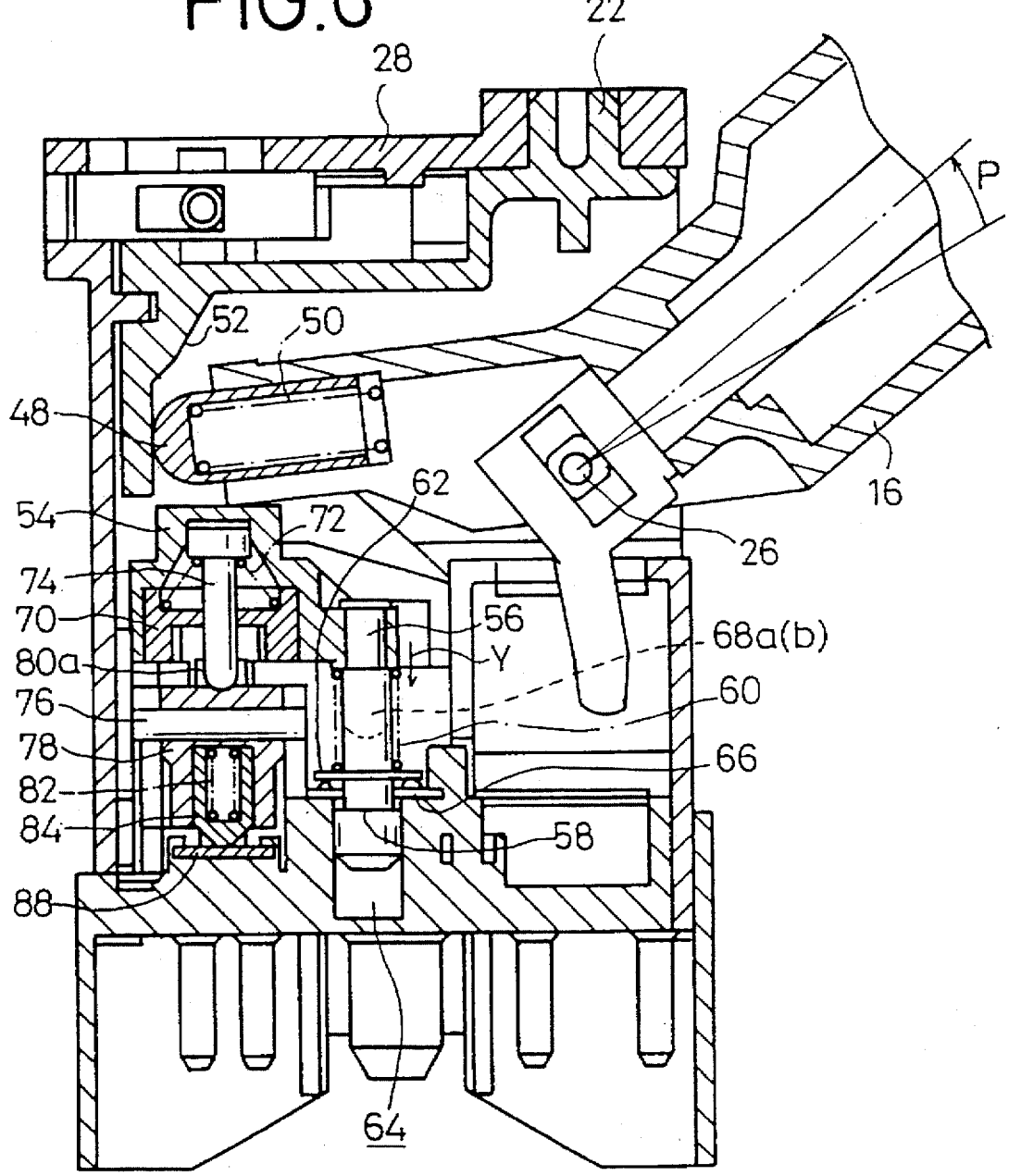
FIG. 6 is a cross-sectional view of the hazard, passing, and upper/lower beam switching structure, shifted to a passing position, in the control unit.
Figure 7:
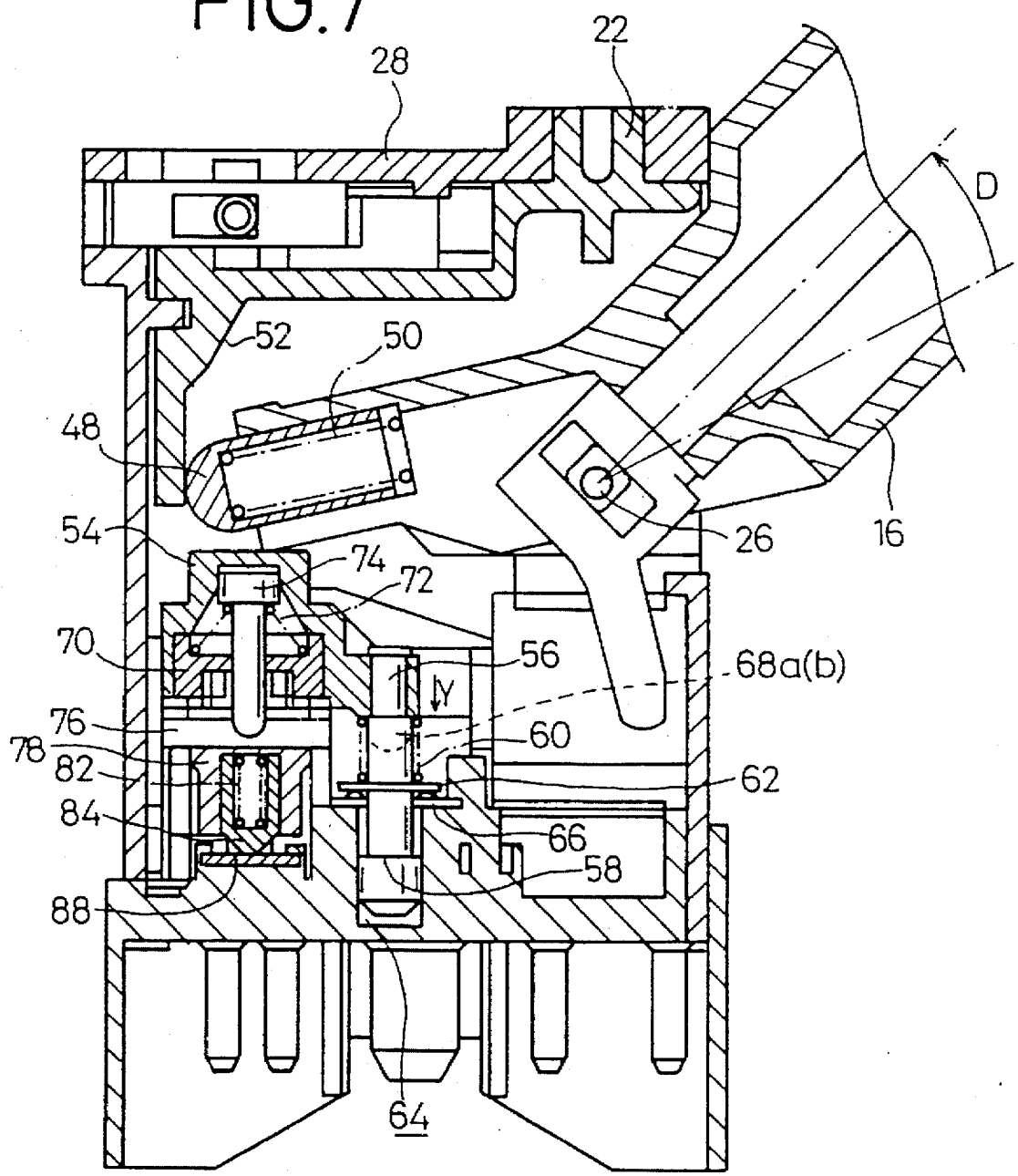
FIG. 7 is a cross-sectional view of the hazard, passing, and upper/lower beam switching structure, shifted to a dimmer position, in the control unit.
Figure 8:
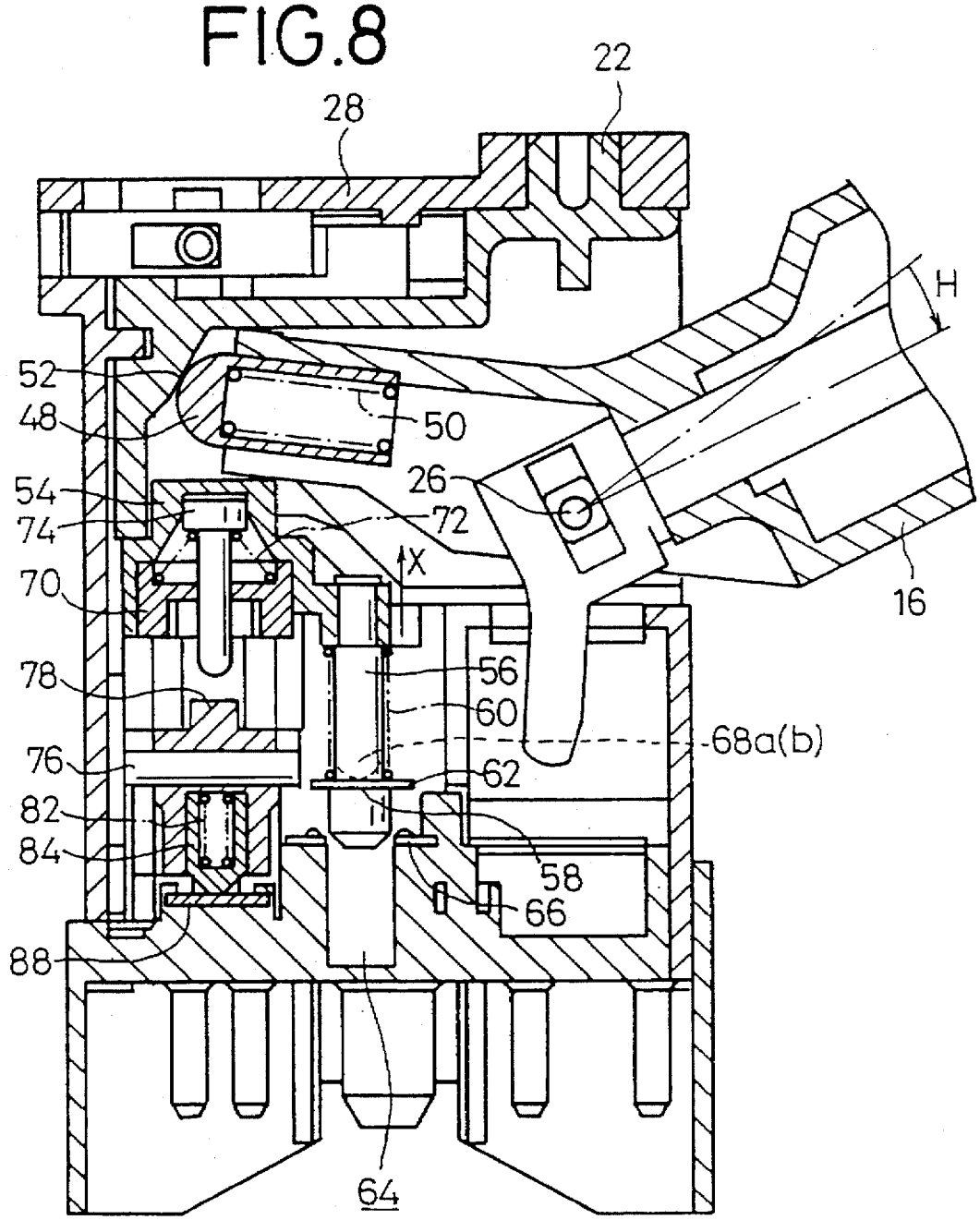
FIG. 8 is a cross-sectional view of the hazard, passing, and upper/lower beam switching structure, shifted to a hazard position, in the control unit.
Figure 9:
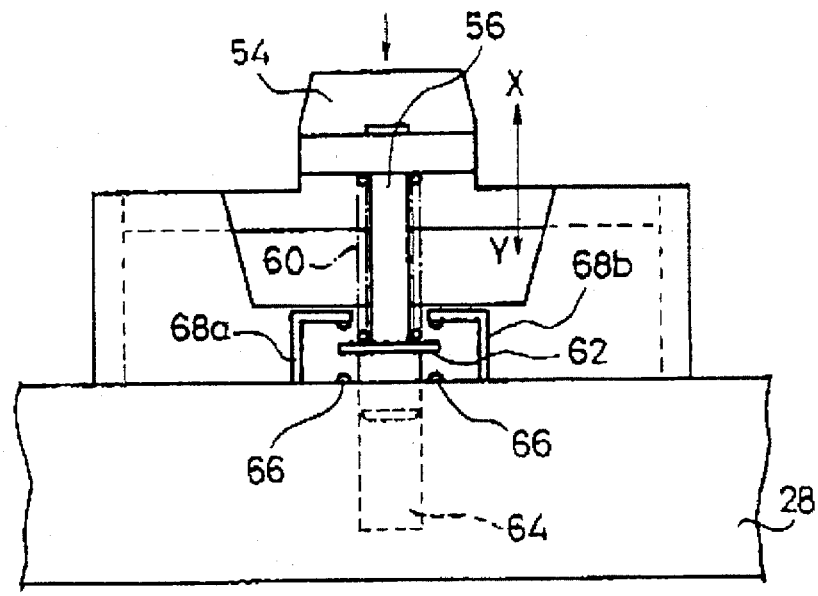
FIG. 9 is an elevational view of the hazard, passing, and upper/lower beam switching structure as viewed in the direction indicated by the arrow Z1 in FIG. 5.
Figure 10:
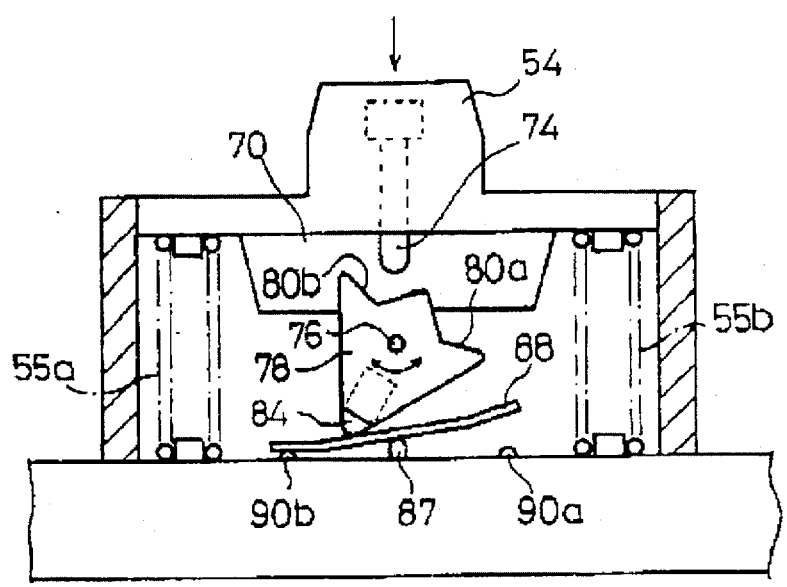
FIG. 10 is an elevational view of the hazard, passing, and upper/lower beam switching structure as viewed in the direction indicated by the arrow Z2 in FIG. 5.

Specifically, as shown in FIG. 6, when the control lever 16 is angularly displaced in the direction indicated by the arrow P, the end of the control lever 16 pushes the elevator 54 in the direction indicated by the arrow Y, bringing the movable contact 62 supported on the stepped pin 56 into contact with the passing fixed contact 66. As a result, a processing circuit (not shown) supplies a control signal to energize the head lamps for temporarily emitting upper beam illumination in the passing state. Inasmuch as the elevator 54 is resiliently supported by the springs 55a, 55b, when the driver releases the control lever 16, the control lever 16 tends to return to the neutral position under the bias of the springs 55a, 55b, automatically canceling the passing state.

When the control lever 16 is further angularly displaced in the direction indicated by the arrow D (FIG. 7), the end of the control lever 16 pushes the elevator 54 further in the direction indicated by the arrow Y. The shifter pin 74 moves into the recess 80a in the dimmer holder 78, which is turned about the pin 76, causing the dimmer click pin 84 to push the dimmer movable contact 88. The dimmer movable contact 88 is tilted about the dimmer fixed contact 87 (FIG. 10), bringing the dimmer movable contact 88 into contact with the dimmer fixed contact 90a. The head lamps are now energized to emit upper beam illumination. When the driver releases the control lever 16, the control lever 16 returns to the neutral position under the resiliency of the springs 55a, 55b. However, since the dimmer movable contact 88 remains tilted by the dimmer click pin 84, the head lamps are continuously energized to emit upper beam illumination.

When the control lever 16 is angularly displaced again in the direction indicated by the arrow D, the shifter pin 74 moves into the other recess 80b in the dimmer holder 78. The dimmer holder 78 is turned about the pin 76. The dimmer movable contact 88 is tilted about the dimmer fixed contact 87, bringing the dimmer movable contact 88 into contact with the dimmer fixed contact 90b. The head lamps are now switched to emit lower beam illumination.

Figure 15:
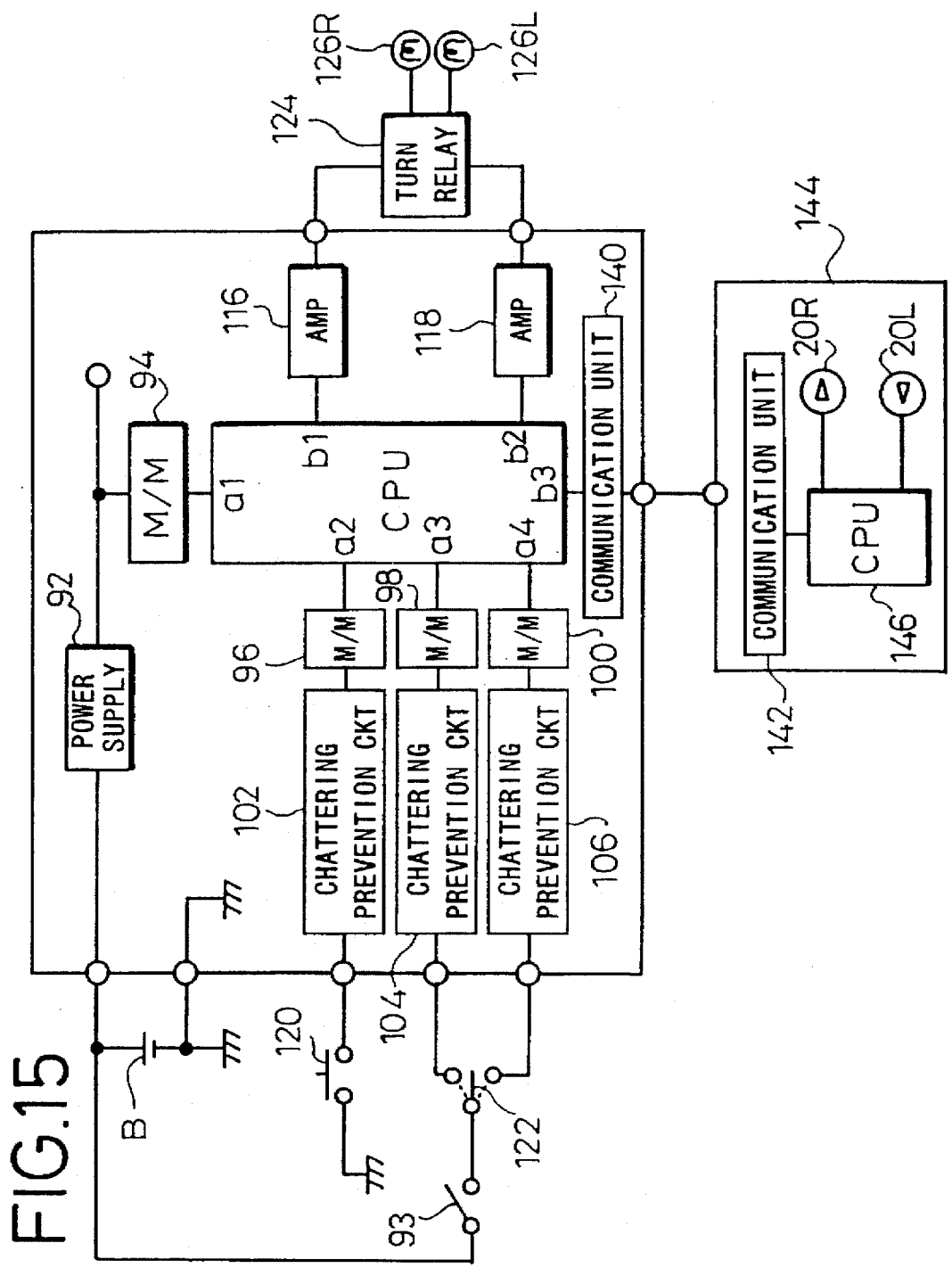
FIG. 15 is a block diagram of another processing circuit for controlling the hazard warning lamp device according to the present invention.

The OR gates 108, 110, 112 and the D-flip flop 114 in the processing circuit shown in FIG. 11 may be replaced with a CPU (central processing unit) 138 as shown in FIG. 15, for processing signals to be outputted from output terminals b1~b3 according to signals supplied to input terminals a1~a4. Other details of the processing circuit shown in FIG. 15 are the same as those of the processing circuit shown in FIG. 11. An operation sequence of the CPU 138 is shown in FIG. 16.

As shown in FIG. 16, the CPU 138 determines whether the hazard switch 120 is turned on or not in a step S10. If the hazard switch 120 is not turned on and if the turn switch 122 is turned on in a direction to produce a right turn signal in a step S12, then the CPU 138 issues control signals to the output terminals b1, b3 in a step S14. The control signal from the output terminal b1 flashes the right turn signal lamp 126R, and the control signal from the output terminal b3 is supplied through communication units 140, 142 to a CPU 146 in a meter unit 144, flashing an indicator lamp 20R. If the hazard switch 120 is not turned on and if the turn switch 122 is turned on in a direction to produce a left turn signal in a step S16, then the CPU 138 issues control signals to the output terminals b2, b3 in a step S18. The control signal from the output terminal b2 flashes the left turn signal lamp 126L, and the control signal from the output terminal b3 is supplied through the communication units 140, 142 to the CPU 146 in the meter unit 144, flashing an indicator lamp 20L. If the turn switch 122 is turned off, producing no left and right turn signals, then the CPU 138 issues no control signals to the output terminals b1~b3 in a step S20, and the left and right turn signal lamps 126L, 126R and the indicator lamps 20R, 20L are de-energized.

If the hazard switch 120 is turned on in the step S10, then the CPU 138 determines whether the left and right turn signal lamps 126L, 126R are presently in the hazard warning state or not in a step S22. If in the hazard warning state, then the CPU 138 interprets the turn-on condition of the hazard switch 120 as an command to cancel the hazard warning state, stopping outputting any control signals to the output terminals b1~b3 in a step S24. Therefore, the left and right turn signal lamps 126L, 126R and the indicator lamps 20R, 20L are de-energized. Stated otherwise, the hazard switch 120 establishes the hazard warning state when it is turned on once, and cancels the hazard warning state when it is turned on twice.

If not in the hazard warning state in the step S22, then since the turn-on condition of the hazard switch 120 in the step S10 is effective, the CPU 138 issues control signals to the output terminals b1~b3 in a step S26, flashing the left and right turn signal lamps 126L, 126R and the indicator lamps 20R, 20L. As a result, the left and right turn signal lamps 126L, 126R and the indicator lamps 20R, 20L are energized in the hazard warning state.

If the turn switch 122 is turned on in the direction to produce a right turn signal in a step S28 while in the hazard warning state, then the CPU 138 stops outputting any control signals to the output terminals b1~b3 in the step S24, canceling the hazard warning state. The CPU 138 then executes the steps S10, S12, S14 thereby to flash the right turn signal lamp 126R and the indicator lamp 20R, indicating that the motor vehicle is making a right turn. If the turn switch 122 is turned on in the direction to produce a left turn signal in a step S30 while in the hazard warning state, then the CPU 138 stops outputting any control signals to the output terminals b1~b3 in the step S24, canceling the hazard warning state. The CPU 138 then executes the steps S10, S12, S16, S18 thereby to flash the left turn signal lamp 126L and the indicator lamp 20L, indicating that the motor vehicle is making a left turn. If the turn switch 122 is turned off and if the hazard switch 120 is turned on in a step S32, then the CPU 128 stops outputting any control signals to the output terminals b1~b3 in the step S24, canceling the hazard warning state.

With the arrangement of the present invention, as described above, since the control mechanism for controlling the hazard warning lamps and the control mechanisms for controlling other lamps are combined with the control lever in the vicinity of the steering wheel, the driver finds it much easier to operate the lamps than if the control mechanism for controlling the hazard warning lamps were positioned on the instrument panel. When the driver switches from the hazard warning state to the direction indicating state, the hazard warning state is automatically canceled, and hence the driver is not required to manually cancel the hazard warning state. Consequently, the driver is free from the risk of forgetting to cancel the hazard warning state. Therefore, the hazard warning lamp device according to the present invention is highly convenient to operate.

Although certain preferred embodiments of the present invention have been shown and described in detail, it should be understood that various changes and modifications may be made therein without departing from the scope of the appended claims.

What is claimed is:

1. A hazard warning lamp device for use with a control lever for controlling turn signals lamps, comprising:
   a control lever movable in first and second directions upwardly and downwardly in a vertical plane, wherein movement of said control lever in said vertical plane energizes the turn signal lamps in a turning direction indicating state, said control lever further being operable in a third direction substantially perpendicular to said first and second directions for energizing the turn signal lamps in a hazard warning state;
   a displacing member operatively connected with said control lever for controlling said turn signal lamps in the hazard warning state, said displacing member being displaceable in response to operation of the control lever in said third direction; and
   a switch mechanism operatively connected with said displacing member and responsive to displacement of said displacing member for closing contacts to generate a signal to energize the turn signal lamps in said hazard warning state;
   said control lever further being displaceable in a fourth direction opposite to said third direction, and further comprising a head lamp switch including a pin for switching head lamps between upper and lower beam illumination, said displacing member comprising means for operating said head lamp switch when the control lever is displaced in said fourth direction.

2. A hazard warning lamp device according to claim 1, wherein said control lever has a return mechanism for resiliently returning the control lever to a neutral position after the control lever has been operated in said third direction.

3. A hazard warning lamp device according to claim 2, wherein said return mechanism comprises a resilient member mounted on an end of said control lever, and a slanted surface engageable by said resilient member when the control lever is operated in said third direction, wherein said control lever is urged to return to the neutral position by said resilient member under reactive forces from said slanted surface.

4. A hazard warning lamp device according to claim 1, wherein said control lever is angularly movable about a shaft along said first and second directions.

5. A hazard warning lamp device according to claim 1, wherein said displacing member has a movable contact displaceable in response to displacement of the displacing member, said switch mechanism having a fixed contact which can be contacted by said movable contact when said displacing member is displaced by said control lever.

6. A hazard warning lamp device according to claim 5, wherein said fixed contact comprises a hazard fixed contact which can be contacted by said movable contact to energize the turn signal lamps in the hazard warning state upon displacement by said control lever of said displacing member in one direction, and a passing fixed contact which can be contacted by said movable contact to energize the head lamps in the passing state upon displacement by said control lever of said displacing member in another direction.

7. A hazard warning lamp device according to claim 1, wherein said displacing member is mounted in an end of said control lever for displacement in an axial direction of the control lever, said switch mechanism comprising an opening and closing mechanism disposed in said control lever for opening and closing the contacts in response to displacement of said displacing member.

8. A hazard warning lamp device comprising:
   a hazard switch for generating a hazard warning signal to energize turn signal lamps in a hazard warning state;
   a turn switch for generating a turn signal to energize the turn signal lamps in a turning direction indicating state;
   turn signal lamp energizing means for energizing the turn signal lamps in either the hazard warning state or the turning direction indicating state in response to said hazard warning signal or said turn signal, respectively; and
   state canceling means for canceling said hazard warning state in response to said turn signal and canceling said direction indicating state in response to said hazard warning signal, wherein only one of said hazard warning state and said turning direction indicating state is energizable at any given time.

9. A hazard warning lamp device according to claim 8, wherein said turn signal lamp energizing means comprises a hazard warning state signal holding circuit for holding said hazard warning signal, a turn signal holding circuit for holding said turn signal, and a control signal generating circuit for generating said turn signal in response to a signal from said hazard warning state signal holding circuit or said turn signal holding circuit, and wherein said state canceling means comprises a preferential signal supply circuit for preferentially supplying a subsequently supplied one of signals supplied from said hazard warning state signal holding circuit and said turn signal holding circuit to said control signal generating circuit.

10. A hazard warning lamp device according to claim 9, wherein said hazard warning state signal holding circuit and said turn signal holding circuit comprise monostable multivibrators, respectively.

11. A hazard warning lamp device according to claim 9, wherein said preferential signal supply circuit comprises a D flip-flop having clock and reset terminals for being supplied with said hazard warning signal and said turn signals, respectively.

* * * * *